Nov. 21, 1967 D. A. HARRIS 3,353,748
VIBRATING DISTRIBUTOR BAR FOR AGRICULTURAL CHEMICALS
Filed Dec. 30, 1964
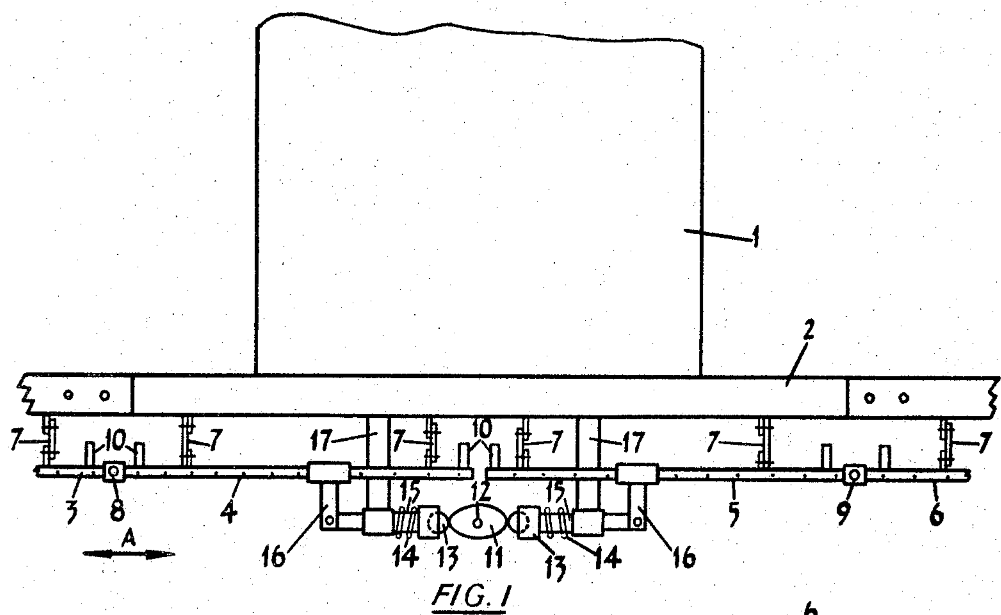
FIG. 1
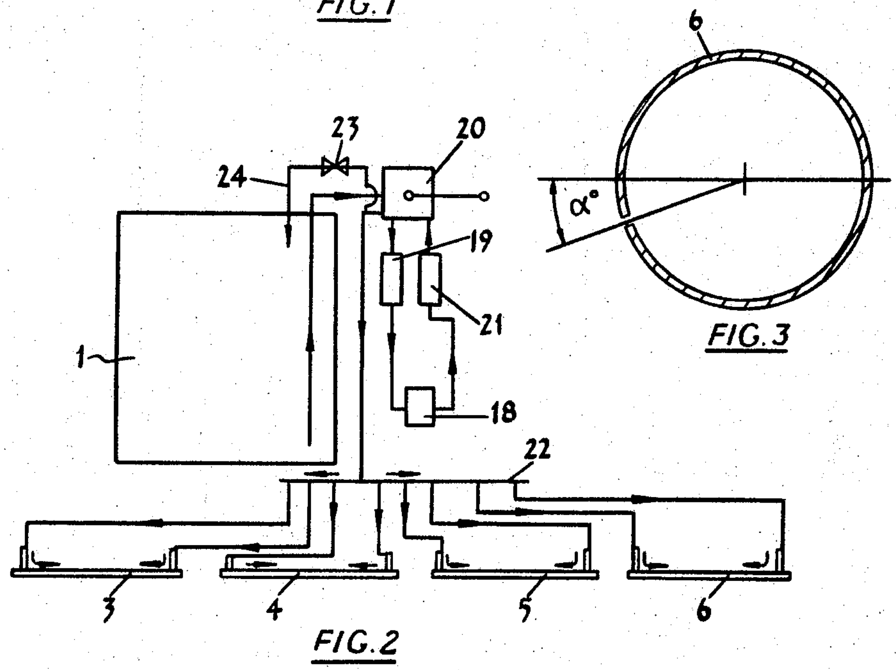
FIG. 2
6
α°
FIG. 3
INVENTOR
DAVID ALAN HARRIS
BY
Cushman, Darby & Cushman
ATTORNEYS 3,353,748
VIBRATING DISTRIBUTOR BAR FOR AGRICULTURAL CHEMICALS David Alan Harris, Fernhurst, England, assignor to Imperial Chemical Industries Limited, London, England, a corporation of Great Britain
Filed Dec. 30, 1964, Ser. No. 422,284
Claims priority, application Great Britain, Aug. 14, 1961, 29,244/61
8 Claims. (Cl. 239—102)

This invention relates to a method and a sprinkler apparatus for treating vegetation and soil with liquids, particularly liquid herbicidal compositions, and is a continuation-in-part of United States application, Ser. No. 216,139, filed Aug. 10, 1962, and now abandoned.

Modern methods of agriculture and horticulture require the application of many biologically active substances to growing vegetation, either to kill the vegetation if it consists of weeds, or to kill harmful pests which live on the vegetation or in the ground. In many cases the treating substances are solid and the most convenient way of using them is to convert them into a suitable liquid formulation which is then applied by means of a sprinkler apparatus.

Various kinds of sprinkler apparatus for such liquids are known in which the liquid is discharged through a nozzle or nozzles which produce sprays of drops having a wide spectrum of drop size. For example, in the application of liquid herbicidal compositions to crops the practice has been for the composition to be applied from a c op spraying machine comprising a fixed tube provided along its length with a series of specially designed atomizer nozzles for the liquid. These nozzles result in the liquid being discharged with considerable force as a fine spray which contains drops whose sizes vary widely but containing a large proportion of very small drops, i.e., having average sizes of 10 to 130 or 150 microns. The use in agriculture of such sprays leads to the problem of the small drops drifting on the wind and damaging susceptible crops growing in the vicinity, and this is particularly serious where a herbicidal composition is applied.

The spray drift problem referred to above is particularly serious where the herbicidal composition contains a hormone herbicide, for example a phenoxy-alkanoic acid herbicide such as those commonly know by the abbreviations 2:4–D, MCPA, and CMPP which are used widely for selective weed control in cereal crops. The risk of damage from spray drift is so serious in some areas that spraying with hormone herbicides can only be carried out in still conditions. This often means that the herbicide cannot be applied when most convenient and, in some instances, it is not possible to use such products at all where a susceptible crop is growing in the vicinity of the cereal crop which it is desired to spray. However, despite this severe practical limitation on the use of herbicides, particularly the application of hormone herbicides, no satisfactory method of avoiding spray drift has hitherto been devised.

It has now been found that the problem of spray drift can be mitigated by use of the method and apparatus of this invention.

Accordingly, the present invention provides a method of applying a liquid, for example a herbicidal composition, wherein the liquid is supplied to a vibrating distributor having a number of discharge orifices for the liquid, the degree of vibration and size of the orifices being such that the liquid discharged from the orifices falls to the ground as drops which are sufficiently large as not to result in any substantial spray drift.

The invention also includes a sprinkler apparatus for liquids comprising a distributor having an inlet through which the liquid can be supplied to the distributor, and a number of discharge orifices for the liquid, and means for vibrating the distributor so that liquid discharged issues from the orifices and falls to the ground as drops which are sufficiently large as not to result in any substantial spray drift. Preferably the orifices are inclined to the vertical.

When liquid issues from the orifices it does not, as might be supposed, become shattered into clouds of fine drifting droplets by the violent action of the distributor, but instead the liquid forms large drops which, as indicated above, have little tendency to drift. This device is particularly suitable for use in weed control since it not only enables liquid herbicide to be applied with great economy with regard to the amount of liquid used, but in addition it permits efficient weed control to be effected in areas in the immediate vicinity to growing crops without damage to them.

For low volume spraying within the range of about 2 to 25 gallons per acre, the liquid is preferably supplied under a constant head within the range of about 2 to 6 feet which can be achieved by a pump set to raise the liquid from a tank to the desired height before the liquid is piped to the distributor inlet. For spraying at volumes greater than 25 gallons per acre, the head, orifice diameter and degree of vibration are accordingly increased. The means for vibrating the distributor is conveniently actuated mechanically, for example, by a cam or a crank, and, where the apparatus is used in conjunction with a tractor, drive for the crank or cam may be taken from the tractor power take-off via a propeller shaft. Alternatively, the means for vibrating the distributor can be actuated electromagnetically. If desired, the pump may be replaced by a tank having a capacity sufficient for the area to be sprayed and having a depth so that any variation in head due to a decrease in liquid level in the tank does not substantially affect the distribution of liquid.

The distributor is conveniently a perforated tube having closed ends and where it is desired to apply a liquid herbicidal composition, the tube is preferably arranged to be carried horizontally above the ground. Preferably the tube has two or more inlets for the liquid and, where two inlets are used, the inlets are disposed respectively adjacent the ends of the tube. The provision of two or more inlets produces a balanced liquid supply which serves to reduce pressure drop along the tube as well as liquid starvation to the nozzles due to the vibrating motion of the tube.

The discharge orifices can be a series of small holes drilled at various points along the length of the tube but, if desired, ceramic, plastic, or other nozzles may be fitted therein. During investigations, it was found that in general, drilled orifices result in the streams of discharged liquid breaking up into drops earlier than where ceramic nozzles are used; and drilled orifices produce a spray of greater cone angle, that is the degree of divergence of the spray, than the ceramic nozzles.

The selected size and disposition of the discharge orifices depend upon a number of factors including the viscosity of the liquid to be applied and the pressure exerted upon the liquid at the orifices. Hence, the dimensions preferred herein may be subject to some variation contingent upon the particular factors involved. Similarly, the optimum height at which the distributor is carried with respect to the surface to be sprayed will be subject to some variation depending on conditions. However, in order to produce a continuous non-drift spray, it is important that the liquid pressure be sufficient for the frequency and amplitude chosen. Also, pressure will affect the application rate and may have to be limited accordingly.

The size and pitch of the orifices are governed by the application rate which is desired. For satisfactory liquid distribution, each cone of spray must overlap and the pitch is so chosen in relation to amplitude, pressure and orifice shape to give the required cone angle from each orifice.

Vibration frequency must be sufficient to give satisfactory liquid distribution and this is especially important where the liquid is discharged vertically downwards. Where the discharge is inclined below the horizontal, the liquid distribution is improved and the vibration frequency may be reduced.

The amplitude of vibration should be the minimum to give a good spray. If the amplitude of vibration is unnecessarily large, the drive will require more power and wear will be accelerated and on the other hand, if the amplitude is too small, an unsatisfactory liquid distribution will result.

According to one form of this invention, the sprinkler apparatus comprises a distributor tube having two or more inlets through which it can be supplied with liquid and having discharge orifices of a diameter within the range of about 0.01 to 0.125 inch disposed in line along the length of the tube at a pitch within the range of about 1½ to 4½ inches and inclined at an angle between about 0 and 90° below the horizontal, and means for vibrating the distributor within an amplitude range of about 0.125 to 0.5 inch at a frequency of at least about 500 to about 2000 or 3000 vibrations per minute (v.p.m.), to distribute droplets predominantly having diameters in the range of about 300 to 5000 microns. The term vibrations per minute (v.p.m.) used in this specification refers to complete vibration cycles.

Preferably the orifices are inclined between 5 and 45° below the horizontal and, if desired, the distributor may have a certain number of orifices disposed to discharge liquid vertically and the remainder of the orifices disposed to discharge liquid at an angle inclined to the vertical. The discharge of liquid in a vertical direction is particularly suitable for spraying the ground around the base of such fruits as black currants and vines.

In one preferred form, it has been found that the following dimensions give excellent results: $\frac{1}{32}$ inch orifice diameter; 2 inches orifice pitch; an orifice inclination of 20° below the horizontal; ⅜ inch amplitude of vibration and a speed of vibration of 1100 v.p.m. to provide droplets, the bulk of which have diameters within the range of 500 to 1600 microns. Preferably the apparatus includes a supply tank from which the liquid is pumped at a certain pressure or raised to a certain head to give an equivalent pressure head, before being fed to the distributor inlet(s).

The inclination of the orifices between 5 and 45° below the horizontal results in the spray of liquid discharged developing a pattern to give the required distribution at a minimum height above the crop to be sprayed. However, a good liquid distribution pattern is obtained even when the distributor cannot be maintained at a constant height above the crop to be sprayed and, generally, it is only necessary to provide sufficient clearance to avoid the distributor striking the ground when used on rough land.

Conveniently, to avoid undue pressure drop and liquid starvation in the distributor tube it has been found that instead of a single tube, the distributor may usefully comprise four, or a larger number of even smaller tubes, preferably each having an inlet adjacent each end and arranged with their longitudinal axes in line. Where four tubes are used, the tubes are preferably rigidly connected in pairs and, for dynamic balance, each pair is caused to vibrate in opposite directions. Thus, at any one instant the two pairs are moving towards each other and at another instant the pairs are moving away from each other.

Further inventive features are included in the following particular description of sprinkler apparatus given by way of example with reference to the accompanying drawings, in which:

FIGURE 1 is an elevation showing a general arrangement of the sprinkler according to the invention;

FIGURE 2 is a diagrammatic view showing a liquid circuit for the sprinkler of FIGURE 1; and FIGURE 3 is a transverse section through the distributor tube 6 shown in FIGURE 1.

Basically, the present apparatus uses a pump to raise liquid from a tank to a certain predetermined level so that the liquid is supplied to a distributor under a constant head. The distributor is a tube drilled at various points along its length to form a series of discharge orifices which may be fitted with nozzles, and a cam is employed to vibrate the distributor so that liquid discharged issues from the orifices as streams which are broken up so as to fall to the ground as a shower of drops.

FIGURE 1 is a general arrangement of the sprinkler having a tank 1 carried on a frame 2 which is constructed so that the sprinkler can be mounted on a tractor or other conventional machine. The distributor consists of four similar tubes designated as 3, 4, 5 and 6, respectively, which are suspended from the frame 2 by webbing flexure strips 7 constructed to permit longitudinal vibratory movement in a direction indicated by arrows A and resist movement in a direction at right angles to the plane of FIGURE 1. Each distributor tube is drilled at various points along its length to form a series of discharge orifices. The discharge orifices may be disposed so that liquid is discharged either vertically or in a direction inclined to the vertical or, in certain circumstances, a combination of vertical and inclined discharge may be used. FIGURE 3 shows the distributor tube 6 in cross-section with the orifices inclined at an angle $\alpha$ to the horizontal. The angle $\alpha$ may be within the range of 0 to 90° below the horizontal. The two pairs of distributors 3–4 and 5–6 are respectively interconnected by sleeves 8 and 9 so that the members of each pair vibrate in unison. Each distributor is supplied with liquid from the tank 1 through inlets 10 disposed adjacent the ends of the tubes and each pair of tubes is caused to vibrate by means of a cam 11. In FIGURE 1 the cam has two lobes but, if desired, four lobes may be used. The cam is mounted on a shaft 12 which runs in two bearings (not shown) and drive for the cam is taken from the power take-off of the tractor via a propeller shaft. The cam 11 has two followers 13 consisting of two sealed ball races which are mounted on push rods 15 and biased toward the cam by helical springs 14. The push rods 15 are respectively connected to the pairs of distributor tubes by arms 16, and the push rods are slidably mounted in bearings (not shown) housed in brackets 17 which are secured to the frame 2.

FIGURE 2 shows the liquid circuit for the sprinkler of FIGURE 1 wherein a pump 18 draws liquid from the base of the tank 1 through a suction filter 19 and, according to the setting of a control valve 20, liquid is directed through a pressure filter 21 to a header pipe 22. The header pipe 22 has eight outlets each connected to one of the inlets 10. The liquid pressure in the circuit is controlled by a by-passed valve 23 which, according to requirements, passes more or less liquid back into the tank through return pipe 24.

The following table indicates the results obtained by high-speed photography using various combinations of orifice diameter, pressure head, amplitude of vibration, speed of vibration and the number of inlets of a short test distributor tube. For each of the runs listed in the table liquid was discharged vertically and the orifices were disposed at a pitch of 2 inches in a distributor tube having a nominal bore of ½ inch.

| Run No. | Nozzle | Liquid Head (feet of water) | Amplitude of Vibration (in.) | Frequency (v.p.m.) | Liquid Supply | Cone Width 4" from Orifice (in.) | Meeting Point of Two Adjacent Sprays Below Orifice (in.) |
|---|---|---|---|---|---|---|---|
| 1 | 1/32 in. drilled tube | 2 | ½ | 1, 100 | Single side | 4. 0 | 2. 5 |
| 2 | 1/32 in. ceramic nozzle | 4 | ½ | 1, 100 | do | 1. 1 | 5. 1 |
| 3 | 1/32 in. ceramic nozzle | 4 | ¼ | 1, 600 | Double sided entry | 1. 27 | 6. 7 |

Run 1 produced a wide cone angle and a continuous spray of substantially even drop size. Run 2 produced a narrower cone than Run 1 with continuous spray and although it appeared that the sizes of the drops were uneven they were sufficiently large to be satisfactory. Run 3 produced a narrow cone and an even spray.

The following table sets out details of an apparatus in accordance with the invention employing drilled orifices inclined rearwardly to the direction of motion and at an angle of 20° below the horizontal in a distributor tube having a nominal bore of ½ inch.

| Orifice diameter (inches) | Orifice pitch (inches) | Pressure Head (feet of water) | Frequency (v.p.m.) | Amplitude of Vibration (inches) |
|---|---|---|---|---|
| 1/32 | 4 | 4½ | 1, 100 | ¼ |
| 1/32 | 4 | 4½ | 1, 100 | ⅜ |
| 1/32 | 2 | 4½ | 1, 100 | ⅜ |
| 1/32 | 2 | 20 | 1, 100 | ⅜ |

A field trial employing the sprinkler apparatus described above with reference to the drawings and having specific dimensions as set out below was carried out with the apparatus mounted on the rear of a tractor.

Tank capacity: 50 gallons.
Distributor: Four tubes, two of 6 feet length and two of 3 feet length and each having a nominal bore of ½ inch were connected in pairs (as already described). Each pair consisted of one 6 foot tube and one 3 foot tube to give an overall distributor length of 18 feet. The distributor was set at a height of 2 feet above the ground.
Orifices: Drilled at a pitch of 2" having a diameter of 1/32 inch and disposed to face rearwardly of the direction of travel at an inclination of 20° below the horizontal.
Vibration: Amplitude ¼ inch.
Means to provide vibration: A two lobe cam having a rise of ¼ inch; driven from tractor power take-off via a propeller shaft.
Cam speed: 550 r.p.m., that is 1100 v.p.m.
Liquid pressure head: 4½ feet.

This apparatus was used to apply an MCPA hormone herbicide composition obtained by dissolving in water at a concentration of 4 pints per 25 gallons of water. With such dilutions the viscosity of the composition is not appreciably greater than that for water and, in general, is in the region of 1 centipoise. The resulting solution was sprayed at a rate of 25 gallons per acre. The test was made in a wind having a speed of about 15 m.p.h. with the tractor travelling at 4 m.p.h. and it was found that young kale and potted tomato plants placed no more than two feet away and down wind from the extremity of the vibrating distributor were unaffected by the spray. Furthermore, the apparatus provided an even distribution of hormone weed killer during the test. By way of comparison, the application of the same herbicidal composition under identical weather conditions but using a conventional fixed boom spraying machine having atomizer nozzles, resulted in severe damage of young tomato and kale plants placed 2 feet away from the end of the spray boom of the machine.

The range of drop size obtained using an apparatus in accordance with the present invention was measured and compared as described below with drops obtained using a conventional spray.

Details of apparatus in accordance with the present invention:

Rate of application: 20 gallons/acre.
Pressure head: 4 feet 6 inches.
Distributor tube bore: ½ inch.
Orifice: Drilled at a pitch of 2 inches having a diameter of 1/32 inch and disposed to face rearwardly of the direction of travel at an inclination of 20° below the horizontal.
Vibration: Amplitude ⅜ inch at 900 v.p.m.

Details of conventional spraying machine:

Rate of application: 20 gallons/acre.
Pressure head: Equivalent to 60 feet.
Nozzle: 1 ceramic tipped flat fan nozzle designated number 0.

In order to separate the drops and to facilitate accurate measurement thereof, both machines were run at a speed of 8 m.p.h. This speed is slightly greater than that required to give a 20 gallon per acre rate of application but at the correct speed for this application the drops have a tendency upon impact with the ground to spread and coalesce which would lead to an incorrect measurement and accordingly the speed was increased to overcome this tendency. In order to measure drop size, the liquid was discharged onto a mixture of petroleum jelly and liquid paraffin. (The mixture containing between 24 and 30% petroleum jelly.) After the discharged liquid was collected on the petroleum jelly/paraffin mixture, further liquid paraffin was added so that any drops remaining on the surface of the mixture assumed spherical shapes. A count of 130 drops of liquid discharged from each machine revealed that the bulk of droplets from the conventional machine had a diameter ranging between 60 and 130 microns whereas the bulk of droplets discharged from the present machine had a diameter within the range 500–1600 microns.

It should be understood that the foregoing example is illustrative rather than limiting on the invention, and that the present invention may be subject to various changes that will be apparent to those skilled in the art. Thus, while specific reference has been made above to hormone herbicides, the method and apparatus of this invention can be applied to fungicides and other herbicides, for example, the dipyridylium quaternary salt herbicides known by the common name diquat and paraquat and to insectides such as the systemic organo phosphorous insecticide known by the common name menazon.

Further, some changes in the design of the present apparatus may be made without departing from the spirit of the invention. For example, the sprinkler apparatus of the invention may be provided in the form of a device adapted to be mounted on tractors and various wheeled vehicles, or it may be provided as an integral unit on a tractor, trailer, or the like vehicle.

It will thus be recognized from the foregoing description that the term "mobile," when used in the claims herein, contemplates the use of both wheeled and non-wheeled apparatus, as will be obvious to one in the art. Accordingly, the invention should only be limited to the scope of the appended claims.

What is claimed is:

1. A sprinkler apparatus for distributing crop treating liquid compositions comprising a distributor having a liquid supply inlet and a plurality of liquid discharge orifices, said liquid discharge orifices having a diameter within the range of 0.01 to 0.125 inch, and said orifices being inclined at an angle between 0 and 90° below the horizontal, and means to reciprocate said distributor within an amplitude range of about ⅛ to about ½ inch at a frequency within the range of at least about 500 to about 3000 vibrations per minute to produce a continuous stream of relatively coarse liquid droplets having diameters such that the droplets are sufficiently large to avoid spray drift.

2. A mobile sprinkler apparatus for distributing crop treating liquid compositions comprising a distributor having a liquid supply inlet and a plurality of liquid discharge orifices, said liquid discharge orifices having a diameter within the range of 0.01 to 0.125 inch, and said orifices being inclined at an angle between 0 and 90° below the horizontal, and means to reciprocate said distributor within an amplitude range of about ⅛ to about ½ inch at a frequency within the range of at least about 500 to about 2000 vibrations per minute to produce a continuous stream of relatively coarse liquid droplets having diameters such that the droplets are sufficiently large to avoid spray drift.

3. The mobile sprinkler apparatus of claim 2 including means to supply liquid to said distributor under a constant head within the range of 2 to 6 feet.

4. A sprinkler apparatus for applying crop treating liquids comprising a distributor tube having a plurality of liquid supply inlets and having a plurality of discharge orifices, the discharge orifices having a diameter within the range of 0.01 to 0.125 inch disposed in line along the length of the tube at a pitch within the range of 1.5 to 4.5 inches and inclined at an angle between 0 and 90° below the horizontal, and means for vibrating the distributor along its longitudinal axis within an amplitude range of ⅛ to ½ inch at a frequency within the range of 500 to 3000 vibrations per minute to produce coarse liquid droplets that are sufficiently large to avoid spray drift.

5. A sprinkler apparatus for applying crop treating liquids comprising a distributor tube having a plurality of liquid supply inlets and having a plurality of discharge orifices, the discharge orifices having a diameter within the range of 0.01 to 0.125 inch disposed in line along the length of the tube at a pitch within the range of 1.5 to 4.5 inches and inclined at an angle between 0 and 90° below the horizontal, and means for vibrating the distributor along its longitudinal axis within an amplitude range of ⅛ to ½ inch at a frequency within the range of 500 to 2000 vibrations per minute to produce coarse liquid droplets that are sufficiently large to avoid spray drift.

6. The mobile sprinkler apparatus of claim 5 wherein the discharge orifices are inclined at an angle between 5 and 45° below the horizontal.

7. A sprinkler apparatus for distributing crop treating liquid compositions comprising a distributor having a liquid supply inlet and a plurality of liquid discharge orifices, said liquid discharge orifices having a diameter within the range of 0.01 to 0.125 inch, and means to reciprocate said distributor at a frequency within the range of at least about 500 to about 3000 vibrations per minute to produce a continuous stream of relatively coarse liquid droplets having diameters within the range of about 500 to 5000 microns such that the droplets are sufficiently large to avoid spray drift.

8. A mobile sprinkler apparatus for distributing crop treating liquid compositions comprising a distributor having a liquid supply inlet and a plurality of liquid discharge orifices, said liquid discharge orifices having a diameter within the range of 0.01 to 0.125 inch, and means to reciprocate said distributor at a frequency within the range of at least about 500 to about 2000 vibrations per minute to produce a continuous stream of relatively coarse liquid droplets having diameters within the range of 500 to 1600 microns such that the droplets are sufficiently large to avoid spray drift.

References Cited

UNITED STATES PATENTS

| | | | |
|---|---|---|---|
| 2,363,776 | 11/1944 | Dale | 239—160 X |
| 2,405,857 | 8/1946 | Siever | 239—102 X |
| 2,532,554 | 12/1950 | Joeck | 239—4 |
| 3,103,310 | 9/1963 | Lang | 239—4 |
| 3,123,305 | 3/1964 | Eisenkraft | 239—102 |
| 3,162,368 | 12/1964 | Choate | 239—102 |
| 3,285,516 | 11/1966 | Waldrum | 239—102 |

M. HENSON WOOD, Jr., *Primary Examiner.*

EVERETT W. KIRBY, *Examiner.*

D. L. MOSELEY, VAN C. WILKS, *Assistant Examiners.*